US009623867B2

(12) United States Patent
Ashizawa et al.

(10) Patent No.: US 9,623,867 B2
(45) Date of Patent: Apr. 18, 2017

(54) CLUTCH CONTROL DEVICE FOR HYBRID VEHICLE

(71) Applicant: Nissan Motor Co., Ltd., Yokohama-shi, Kanagawa (JP)

(72) Inventors: Hiroyuki Ashizawa, Yokohama (JP); Yutaka Takamura, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 14/778,547

(22) PCT Filed: Apr. 3, 2014

(86) PCT No.: PCT/JP2014/059797
§ 371 (c)(1),
(2) Date: Sep. 18, 2015

(87) PCT Pub. No.: WO2014/175030
PCT Pub. Date: Oct. 30, 2014

(65) Prior Publication Data
US 2016/0272192 A1 Sep. 22, 2016

(30) Foreign Application Priority Data

Apr. 26, 2013 (JP) ................................. 2013-093218

(51) Int. Cl.
*B60W 20/19* (2016.01)
*B60W 10/08* (2006.01)
(Continued)

(52) U.S. Cl.
CPC ............ *B60W 20/19* (2016.01); *B60K 6/387* (2013.01); *B60K 6/48* (2013.01); *B60K 6/547* (2013.01);
(Continued)

(58) Field of Classification Search
CPC ...... B60W 20/19; B60W 10/08; B60W 10/06; B60W 20/00; B60W 10/11; B60W 20/40;
(Continued)

(56) References Cited

U.S. PATENT DOCUMENTS 7,749,132 B2 * 7/2010 Motosugi .............. B60W 10/02
477/5
2002/0019290 A1 2/2002 Mesiti et al.
(Continued)

FOREIGN PATENT DOCUMENTS

EP 1 894 805 A2 3/2008
JP 2009-227277 A 10/2009
(Continued)

OTHER PUBLICATIONS

Espacenet Translation of JP2010149640(A), Yajima et al, Jul. 8, 2010, 26 pages.*
(Continued)

*Primary Examiner* — Dale W Hilgendorf
(74) *Attorney, Agent, or Firm* — Global IP Counselors, LLP

(57) ABSTRACT

A hybrid vehicle clutch control device includes an engine, a motor generator, a first clutch, a second clutch and at least one controller. The first clutch interrupts a torque transmission between the engine and the motor generator. The second clutch interrupts the torque transmission between the motor generator and driving wheels. The controller starts the engine using torque from the motor generator, when switching from an electric vehicle mode to a hybrid mode. When starting the engine accompanying an accelerator depression, the allocation of the transmission torque capacity of the second clutch is increased when the accelerator position opening amount is equal to or less than a predetermined accelerator position opening amount, as compared to when
(Continued)

exceeding the predetermined accelerator position opening amount.

2 Claims, 12 Drawing Sheets

(51) Int. Cl.

| | | |
|---|---|---|
| *B60W 10/06* | (2006.01) | |
| *B60W 20/00* | (2016.01) | |
| *B60W 20/40* | (2016.01) | |
| *B60W 10/02* | (2006.01) | |
| *B60K 6/387* | (2007.10) | |
| *B60K 6/547* | (2007.10) | |
| *B60K 6/48* | (2007.10) | |
| *F16D 48/06* | (2006.01) | |
| *B60W 10/11* | (2012.01) | |

(52) U.S. Cl.
CPC ............ *B60W 10/02* (2013.01); *B60W 10/06* (2013.01); *B60W 10/08* (2013.01); *B60W 10/11* (2013.01); *B60W 20/00* (2013.01); *B60W 20/40* (2013.01); *F16D 48/06* (2013.01); *B60W 2540/10* (2013.01); *B60W 2540/103* (2013.01); *B60W 2540/106* (2013.01); *B60W 2710/027* (2013.01); *B60Y 2200/92* (2013.01); *B60Y 2300/182* (2013.01); *B60Y 2300/192* (2013.01); *B60Y 2300/42* (2013.01); *B60Y 2300/429* (2013.01); *B60Y 2300/43* (2013.01); *B60Y 2300/63* (2013.01); *B60Y 2400/42* (2013.01); *Y02T 10/48* (2013.01); *Y02T 10/6221* (2013.01); *Y10S 903/914* (2013.01); *Y10S 903/93* (2013.01)

(58) Field of Classification Search
CPC ....... B60W 10/02; B60K 6/387; B60K 6/547; B60K 6/48; F16D 48/06
See application file for complete search history.

(56) References Cited

U.S. PATENT DOCUMENTS

| | | | | |
|---|---|---|---|---|
| 2005/0054479 | A1* | 3/2005 | Masterson | B60W 10/06 477/3 |
| 2007/0275818 | A1* | 11/2007 | Kouno | B60W 10/02 477/3 |
| 2007/0276557 | A1* | 11/2007 | Motosugi | B60W 10/02 701/22 |
| 2008/0058154 | A1* | 3/2008 | Ashizawa | B60W 10/02 477/5 |
| 2008/0293538 | A1* | 11/2008 | Saito | B60W 10/02 477/3 |

FOREIGN PATENT DOCUMENTS

| | | | |
|---|---|---|---|
| JP | 2009227277 A | * | 10/2009 |
| JP | 2010-111144 A | | 5/2010 |
| JP | 2010-149640 A | | 7/2010 |
| JP | 2010149640 A | * | 7/2010 |
| JP | 2010-188785 A | | 9/2010 |
| JP | 2012-131497 A | | 7/2012 |
| JP | 2012-158327 A | | 8/2012 |

OTHER PUBLICATIONS

Espacenet Translation of JP2009227277(A), Jo, Oct. 8, 2009, 22 pages.*

* cited by examiner

CLUTCH CONTROL DEVICE FOR HYBRID VEHICLE

This application is a U.S. National stage application of International Application No. PCT/JP2014/059797, filed Apr. 3, 2014, which claims priority to Japanese Patent Application No. 2013-093218 filed in Japan on Apr. 26, 2013.

BACKGROUND

Field of the Invention

The present invention relates to a clutch control device for a hybrid vehicle.

Background Information

Conventionally, a hybrid vehicle comprising a first clutch for interrupting the torque transmission between the engine and the motor generator and a second clutch for interrupting the torque transmission between the motor generator and the driving wheel is known. Japanese Laid-Open Patent Application No. 2009-227277 discloses a technique for preventing motor torque from exceeding an upper limit torque by allocating a first clutch torque capacity, which is the cranking torque, and a second clutch torque capacity, which is the driving torque of the vehicle, within a range of the motor upper limit torque when an engine is started by connecting a first clutch after a driver steps on an accelerator. At this time, acceleration of the vehicle via an early engine start is achieved by increasing the allocation of the first clutch torque capacity as the accelerator depression speed of the driver increases.

SUMMARY

In the conventional technology described above, even when the accelerator position opening amount is small, if the accelerator depression speed is high, the allocation of the first clutch torque capacity is increased; as a result, there was the problem that the acceleration is stagnated and that the acceleration performance that is desired by the driver cannot be obtained immediately after depression until starting the engine has been completed.

An object of the present invention is to provide a clutch control device for a hybrid vehicle that can realize the acceleration performance that is desired by the driver.

In the present invention, when starting the engine following an accelerator being stepped on, the allocation of the transmission torque capacity command value of the second clutch is increased if the accelerator position opening amount is equal to or less than a predetermined accelerator position opening amount, as compared to when exceeding the predetermined accelerator position opening amount.

Therefore, when the required acceleration of the driver is small, a drive torque that matches the required acceleration can be generated immediately after depression by prioritizing the increase in the drive torque over the shortening of the engine start time, and an acceleration performance that is desired by the driver can be realized.

BRIEF DESCRIPTION OF THE DRAWINGS

Referring now to the attached drawings which form a part of this original disclosure.

DETAILED DESCRIPTION OF THE EMBODIMENTS

Embodiments of the present invention will be explained below, with reference to the appended drawings. The description below does not limit the technical scope or the meanings of the terms described in the Claims.

First Embodiment

Figure 1:
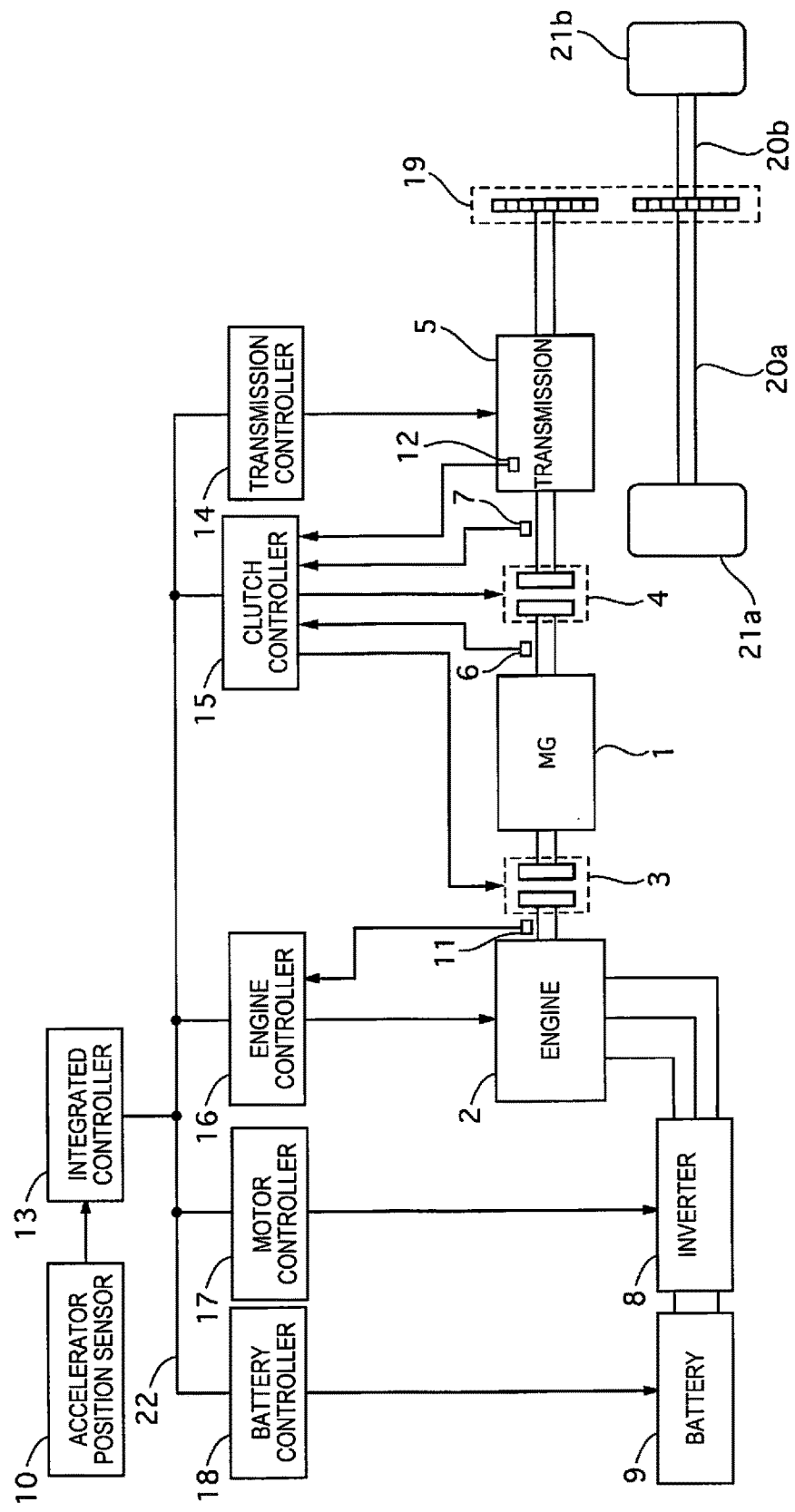
FIG. 1 is a system view of the hybrid vehicle to which is applied the clutch control device of a first embodiment.

FIG. 1 is a system view of the hybrid vehicle to which is applied the clutch control device of the first embodiment. The motor generator (hereinafter referred to as the motor) 1 is an AC synchronous motor, configured to drive the left and right driving wheels 21a, 21b via the drive torque control and to recover the vehicle kinetic energy for the high-voltage battery 9 via the regenerative braking control. The engine 2 is capable of lean combustion, and the engine torque is controlled to match the command value by controlling the intake air amount via a throttle actuator, the fuel injection amount via an injector, and the ignition timing via a spark plug. The first clutch 3 is a dry clutch, which performs the engagement/release between the engine 2 and the motor 1. When the first clutch 3 is in a full engagement state, the motor torque+the engine torque are transmitted to the second clutch 4; when in a released state, only the motor torque is transmitted to the second clutch 4. The second clutch 4 is a wet clutch, in which transmission torque (clutch torque capacity) is generated in accordance with the clutch hydraulic pressure (pressing force). The transmission torque of the second clutch 4 transmits the torque that is output from the motor 1 and the engine 2 (when the first clutch is engaged) to the left and right drive shafts 20a, 20b via the transmission 5 and the final gear 19.

The transmission 5 is a stepped transmission, configured from a plurality of planetary gears. Gear shifting is performed by changing the transmission path of the force by engaging/releasing each of the brake and the clutches inside of the transmission. The second clutch input shaft (motor) rotational speed sensor 6 detects the current input rotational speed of the second clutch 4. The second clutch output shaft rotational speed sensor 7 detects the current rotational speed of the output shaft of the second clutch 4. A high-voltage inverter (hereinafter referred to as an inverter) 8 generates a drive current of the motor 1 by performing DC-AC conversion. A high-voltage battery (hereinafter referred to as the battery) 9 accumulates the regenerative energy from the motor 1. An accelerator position sensor 10 detects the accelerator position opening amount. The engine rotational speed sensor 11 detects the current engine rotational speed. The clutch oil temperature sensor 12 detects the oil temperature of the second clutch 4.

The integrated controller 13 calculates the drive torque command value based on the battery state, the accelerator position opening amount, and the vehicle speed (a value that is synchronous with the transmission output shaft rotational speed). Based on the results thereof, the command value for each actuator (the motor 1, the engine 2, the first clutch 3, and the second clutch 4) is calculated and transmitted to each of the controllers 14-17. The integrated controller 13 (engine starting means) starts the engine 2 by utilizing the torque of the motor generator 1, when switching from an EV (electric vehicle) mode for cutting off the first clutch 3 and traveling with the torque of the motor generator 1, to an HEV (hybrid mode) for connecting the first clutch 3 and traveling with the torque of the engine 2 and the motor generator 1. The transmission controller 14 performs a shift control so as to achieve the gear changing command from the integrated controller 13. The clutch controller 15 controls the current of the solenoid valve so as to realize the clutch hydraulic pressure (current) command value, with respect to each clutch hydraulic pressure command value from the integrated controller 13. The engine controller 16 controls the engine torque so as to achieve the engine torque command value from the integrated controller 13. The motor controller 17 controls the motor torque so as to achieve the motor torque command value from the integrated controller 13. The battery controller 18 manages the charging state of the battery 9 and transmits the information thereof to the integrated controller 13. The communication between each of the controllers 13-18 is performed via a communication line 22.

Control of the Integrated Controller

Figure 2:
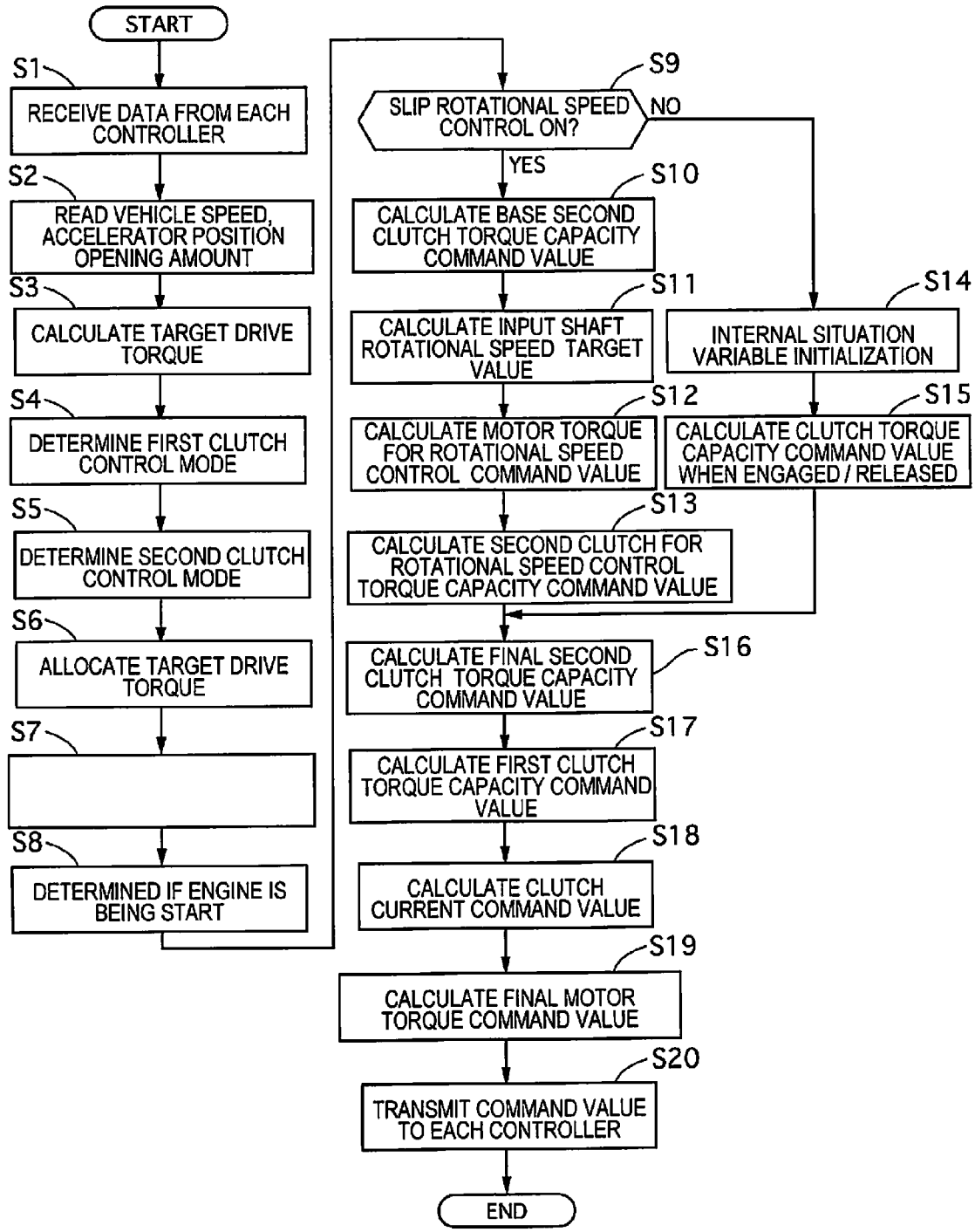
FIG. 2 is a flowchart illustrating the processing content of the integrated controller 13.
Figure 3:
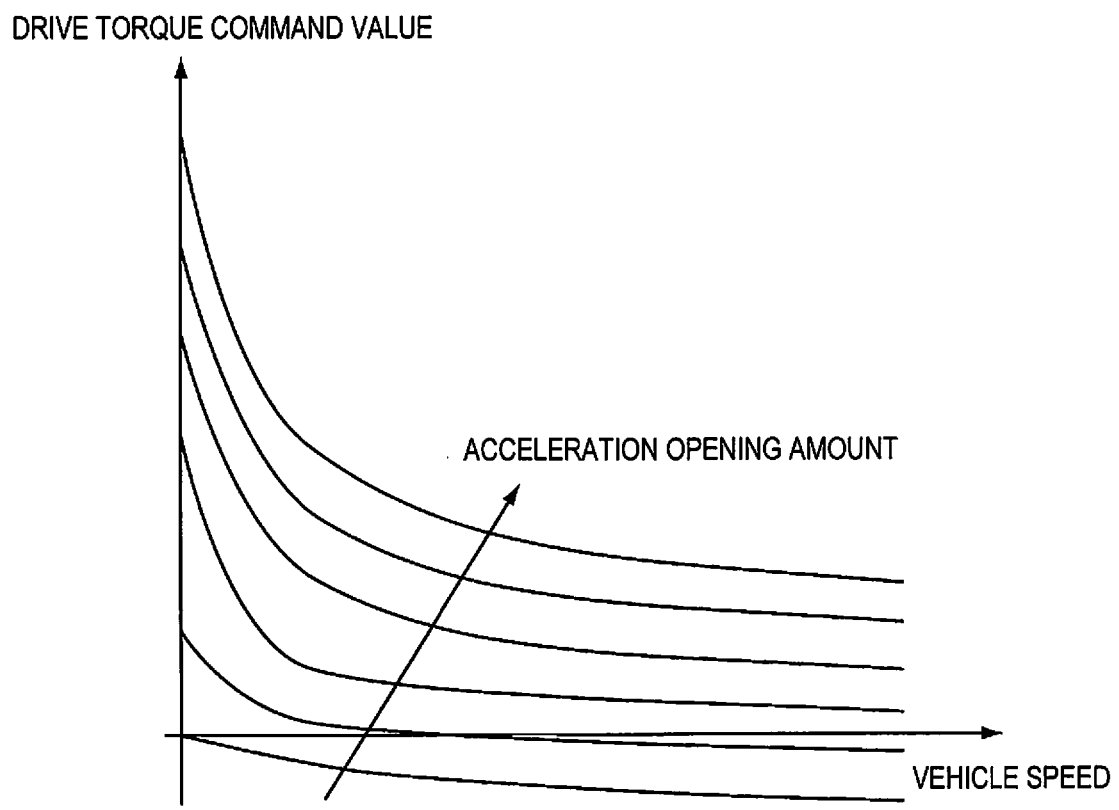
FIG. 3 is a drive torque command calculation map, according to the vehicle speed and the accelerator position opening amount.

FIG. 2 is a flowchart illustrating the processing content of the integrated controller 13. The processing content is assumed to have been executed in a set sampling cycle. In step S1, vehicle states measured by other controllers are received, such as the battery charging amount SOC, the shift position of the transmission 5, the input/output shaft rotational speed of the second clutch 4 $\omega_{cl2i}$, $\omega_0$, the engine rotational speed $\omega_e$, the operating state of the engine $E_{sts}$, and the vehicle speed Vsp. In step S2, the accelerator position opening amount Apo is measured from the accelerator position sensor 10. In step S3 (drive torque command value calculation means), the drive torque command value $T_d^*$ is calculated from the accelerator position opening amount Apo and the vehicle speed Vsp. In the first embodiment, for example, a calculation is performed with reference to a drive torque command value calculation map, corresponding to the vehicle speed Vsp and the accelerator position opening amount Apo, such as illustrated in FIG. 3. In FIG. 3, the drive torque command value $T_d^*$ is set to be larger as the accelerator position opening amount Apo increases, and this value is set to be smaller as the vehicle speed Vsp increases.

In step S4, the first clutch control mode (setting of the first clutch mode flag fCL1) is set from the vehicle states, such as the battery charging amount SOC, the drive torque command value $T_d^*$, and the vehicle speed Vsp. While the details have been omitted here, for example, in a traveling situation in which the efficiency of the engine 2 is relatively poor, such as when starting at a low acceleration, traveling is done by the motor alone (EV mode); therefore, the first clutch 3 is released (fCL1=0). In addition, EV traveling is difficult during rapid acceleration, when the battery charging amount SOC is equal to or less than a predetermined value $SOC_{th1}$ or when the vehicle speed Vsp is equal to or greater than a predetermined value $Vsp_{th1}$ (the motor rotational speed exceeds the allowable rotational speed); therefore, the first clutch 3 is engaged (fCL1=1) in order to travel with the engine 2 and the motor 1 (HEV mode). In step S5, the second clutch control mode CL2MODE (engage, release, slip) is set from vehicle states, such as the battery charging amount SOC, the drive torque command value $T_d^*$, the first clutch control mode flag fCL1, and the vehicle speed Vsp. The method to set the second clutch control mode will be described below.

In step S6, the drive torque command value $T_d^*$ is allocated to a base engine torque command value $T_{e\_base}^*$ and a base motor torque command value $T_{m\_base}^*$, based on the control mode of each clutch and the vehicle state. Various means can be conceived regarding the allocation method, but the details have been omitted. In step S7 (transmission torque capacity allocating means), the torque capacity command values $T_{cl1\_ENG\_START}$, $T_{cl2\_ENG\_START}$ for each clutch when starting the engine are calculated based on the control mode of each clutch, the engine rotational speed $\omega_e$, the drive torque command value $T_d^*$, and various vehicle states. The calculation method will be described in detail below. In step S8, whether or not the engine is being started is determined based on the first clutch control mode flag fCL1, the second clutch input rotational speed $\omega C_{l2i}$, and the engine rotational speed $\omega_e$. In practice, when the first clutch control mode is the engaged mode, and when the engine rotational speed is lower than the second clutch input rotational speed, the engine is determined to be starting, and a starting flag fENG_ST is set; otherwise, the engine is determined to be not starting, and the flag is cleared. In step S9, whether or not a slip rotational speed control of the second clutch 4 should be executed is determined. When the second clutch 4 is set to the slip state in S5 and the absolute value of the actual slip rotational speed (input shaft-output shaft) becomes equal to or greater than a predetermined value, the slip rotational speed control is turned ON, and the operation proceeds to step S10; when set to release or engage, the rotational speed control is turned OFF, and the operation proceeds to step S14.

In step S10, the base second clutch torque capacity command value $T_{cl2\_base}^*$ is calculated. Here, for example, the same value as the drive torque command value $T_d^*$ is assumed. In step S11, the input shaft rotational speed target value $\omega_{cl2i}^*$ is calculated based on the first clutch control mode flag fCL1, the base second clutch torque capacity command value $T_{cl2\ base}*$, the second clutch oil temperature $Temp_{cl2}$, the battery charging amount SOC, and the output shaft rotational speed measurement value $\omega_0$. The calculation method will be described in detail below. In step S12, a motor torque command value for the rotational speed control $T_{m\_FB\_ON}$ is calculated so that the input rotational speed target value $\omega_{cl2i}*$ and the input rotational speed measurement value $\omega_{cl2i}$ match. Various calculation (control) methods can be conceived; for example, the calculation can be done using the following formula (PI control). For the actual calculation, the calculation is done using a recurrence formula that is obtained by discretizing with the Tustin approximation or the like.

Formula 1

$$T_{m\_FB\_ON} = \frac{K_{Pm}S + K_{Im}}{S} \times (\omega_{cl2i*} - \omega_{cl2i}) \quad (1)$$

Where,
$K_{Pm}$: proportional gain for motor control
$K_{Im}$: integral gain for motor control
S: differential operator In step S13, a second clutch torque capacity command value $T_{cl\_FB\_ON}$ for the rotational speed control is calculated based on the base second clutch torque capacity command value $T_{cl2\ base}*$, the motor torque command value for the rotational speed control $T_{m\_FB\_ON}$, and the engine torque command value $T_{e\ base}*$. The calculation method will be described in detail below. In step S14, an internal state variable for calculating the above-described motor torque command value for the rotational speed control $T_{m\_FB\_ON}$ and the second clutch torque capacity command value for the rotational speed control $T_{cl\_FB\_ON}$ is initialized. In step S15, a clutch torque capacity command value $T_{cl2\_FB\_OFF}$ when the rotational speed control is not performed, that is, when the rotational speed is controlled (put into a slip state) from an engaged/released state or an engaged state of the second clutch 4.

1. When engaging
(1) If $T_{cl2\ zl}* < T_d* \times K_{safe}$ $$T_{cl2\_FB\_OFF} = T_{cl2\ zl}* + \Delta T_{cl2LU} \quad (2)$$

(2) If $T_{cl2\ zl}* \geq T_d* \times K_{safe}$ $$T_{cl2\_FB\_OFF} = T_d* \times K_{safe} \quad (3)$$

2. When releasing $$T_{cl2\_FB\_OFF} = 0 \quad (4)$$

3. When the second clutch is engaged→put into a slip state $$T_{cl2\_FB\_OFF} = T_{cl2\ zl}* T_{cl2slp} \quad (5)$$

Where,
$K_{safe}$: second clutch safety factor coefficient (>1)
$\Delta T_{cl2LU}$: torque capacity change rate when transitioning from slip (or release)→engaged
$\Delta T_{cl2slp}$: torque capacity change rate when transitioning from engaged→slip
$T_{cl2\ zl}*$: final second torque command value previous value In step S16, the final second clutch torque capacity command value $T_{cl2}*$ is determined using the following conditions.

1. During slip rotational speed control
(1) During engine start (fENG STEP=1)

$$T_{cl2}* = T_{cl2\_ENG\_START} \quad (6)$$

(2) Cases other than the above $$T_{cl2}* = T_{cl2\_FB\_ON} \quad (7)$$

2. When slip rotational speed control is stopped $$T_{cl2}* = T_{cl2\_FB\_OFF} \quad (8)$$

In step S17, a first clutch torque capacity command value $T_{cl1}*$ is determined based on the first clutch control mode flag fCL1.

1. When the first clutch control mode is in the engaged mode,
(1) During engine start (fENG STEP=1)

$$T_{CL1}* = T_{cl1\_ENG\_START} \quad (9)$$

(2) Cases other than the above $$T_{CL1}* = T_{cl1\ max} \quad (10)$$

Where,
$T_{cl1\ max}$: first clutch maximum torque capacity

2. When the first clutch control mode is in the released mode, $$T_{CL1}* = 0 \quad (11)$$

Figure 4:
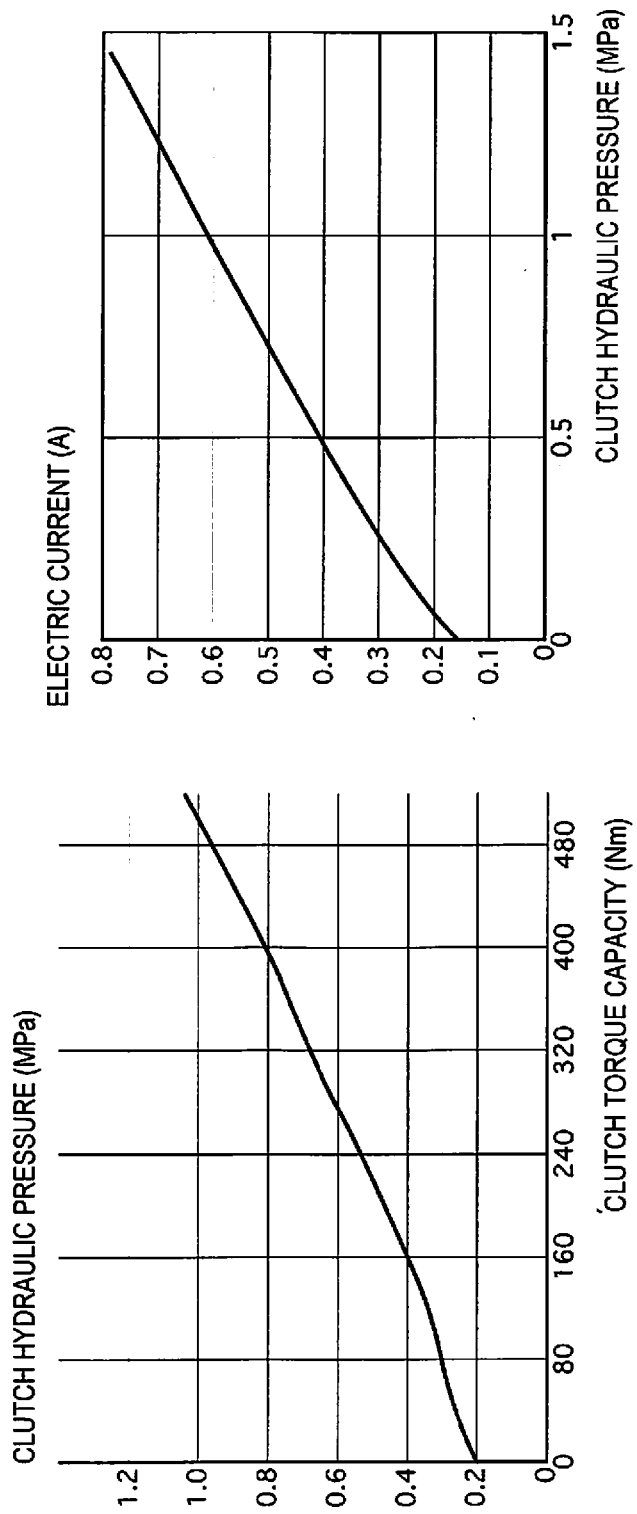
FIG. 4 (a) shows the clutch torque capacity—via a clutch hydraulic pressure conversion map and FIG. 4 (b) shows the clutch hydraulic pressure—via a current conversion map.

In step S18, the current command values $I_{CL1}*$, $I_{CL2}*$ are calculated from the clutch torque capacity command values $T_{CL1}*$, $T_{CL2}*$. In practice, this calculation is performed with reference to the clutch torque capacity—the clutch hydraulic pressure conversion map in FIG. 4(a) and the clutch hydraulic pressure—the current conversion map in FIG. 4(b), which is prepared based on characteristics acquired beforehand. The above-described linear control theory can thereby be applied even when the clutch torque capacity has a non-linear characteristic with respect to the hydraulic pressure and the electric current, since the control target can be considered to be linear. In step S19, the final motor torque command value $T_m*$ is determined based on the following conditions.

1. During slip rotational speed control $$T_m* = T_{m\_FB\_ON} \quad (12)$$

2. When slip rotational speed control is stopped $$T_m* = T_{m\ base} \quad (13)$$

In step S20, the calculated command value is transmitted to each controller.

Second Clutch Control Mode Setting Operation

Figure 5:
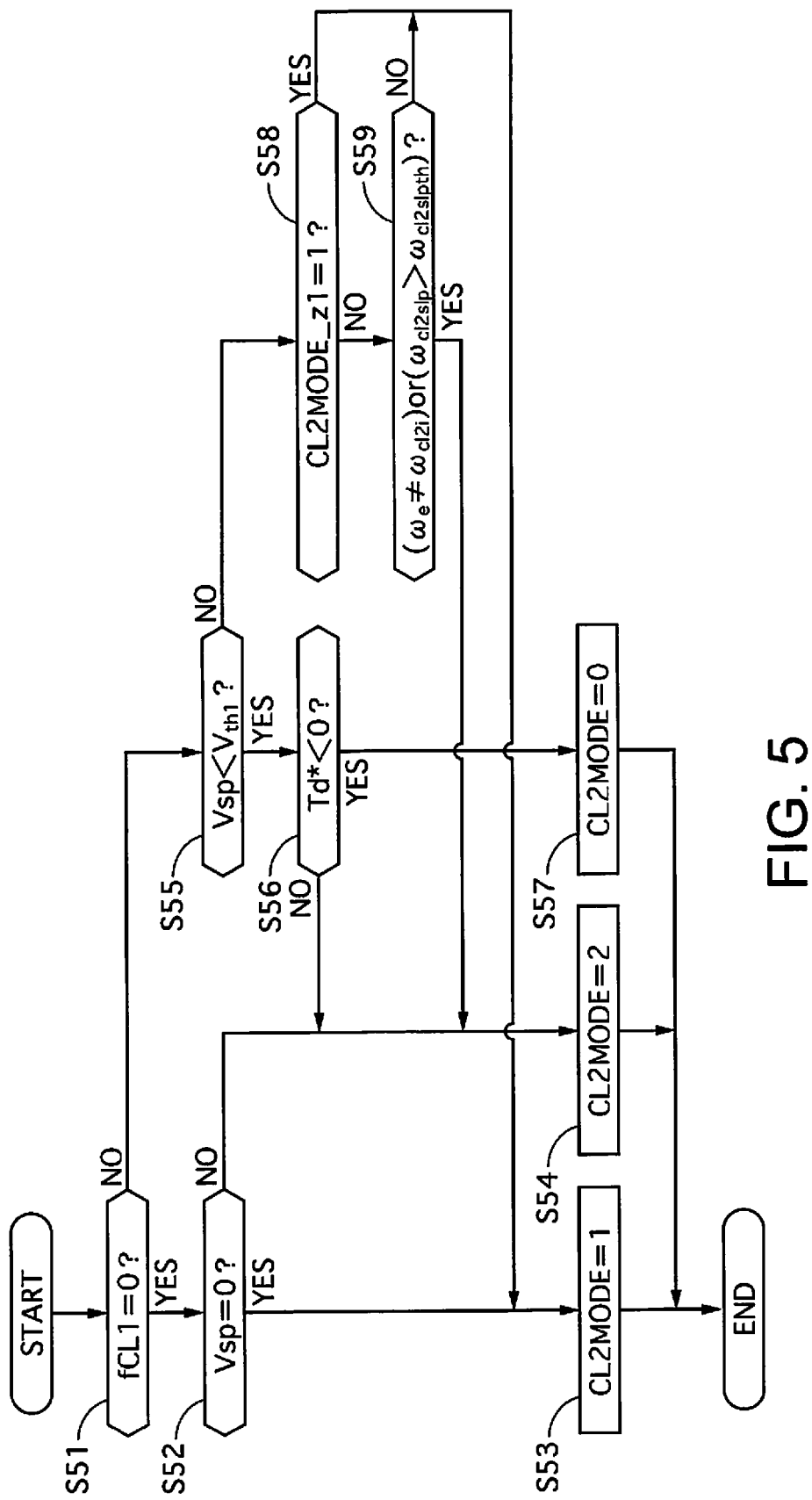
FIG. 5 is a flowchart illustrating a method for setting the second clutch control mode.

FIG. 5 is a flowchart illustrating a method for setting the second clutch control mode. The control mode CL2MODE of the second clutch 4 is set from the vehicle states, such as the battery charging amount SOC, the drive torque command value $T_d*$, the first clutch control mode flag fCL1, and the vehicle speed Vsp. In step S51, the first clutch control mode is determined. If the first clutch control mode is engaged (engine start) (fCL1=1), the operation proceeds to step S55; if this is in the release mode (engine stop) (fCL1=0), the operation proceeds to step S52. In step S52, whether or not the vehicle speed Vsp is zero (stopped) is determined. If stopped, the operation proceeds to step S53; otherwise, the operation proceeds to step S54. In step S53, the second clutch control mode is set to the engaged mode (CL2MODE=1). In step S54, the second clutch control mode is set to the slip mode (CL2MODE=2). In step S55, whether or not the vehicle speed Vsp is higher than a predetermined value Vth1 (for example, the minimum vehicle speed at which the engine can be started) is determined. If lower, the operation proceeds to step S56, and if higher, the operation proceeds to step S58.

In step S56, the sign of the drive torque command value $T_d^*$ is determined; if positive, the operation proceeds to step S54, and if negative, the operation proceeds to step S57. In step S57, the second clutch control mode is set to the release mode (CL2MODE=0). In step S58, whether or not the previous second clutch control mode was the engaged mode is determined. If the mode was the engaged mode, the operation proceeds to step S53; otherwise, the operation proceeds to step S59. In step S59, whether or not a slip continuation condition is satisfied is determined based on the engine rotational speed measurement value $\omega_e$, the second clutch slip rotational speed measurement value $\omega_{cl2slp}$, and a slip rotational speed threshold value $\omega_{cl2slpth}$. When the slip continuation condition is established, the operation proceeds to step S54, and slipping is started or continued; if the condition is not established, the operation proceeds to step S53, and slipping ends to transition to the engaged mode. The slip continuation condition is as follows.

$\omega_e \neq \omega_{cl2i}$ (first clutch released or slip), or, $\omega_{cl2slp} >$ $\omega_{cl2slpth}$ Input Rotational Speed Target Value Calculation Next, the method for calculating the input rotational speed target value $\omega_{cl2i}^*$ will be described. First, the second clutch slip rotational speed target value $\omega_{cl2s1p}^*$ is calculated based on the following.

1. If in the EV mode (fCL1=0)

$$\omega_{cl2\ slp}^* = f_{cl2\ slp\ cl10P}(T_{cl2\ base}^*. \text{Temp}_{cl2}) \qquad (14)$$

Figure 6:
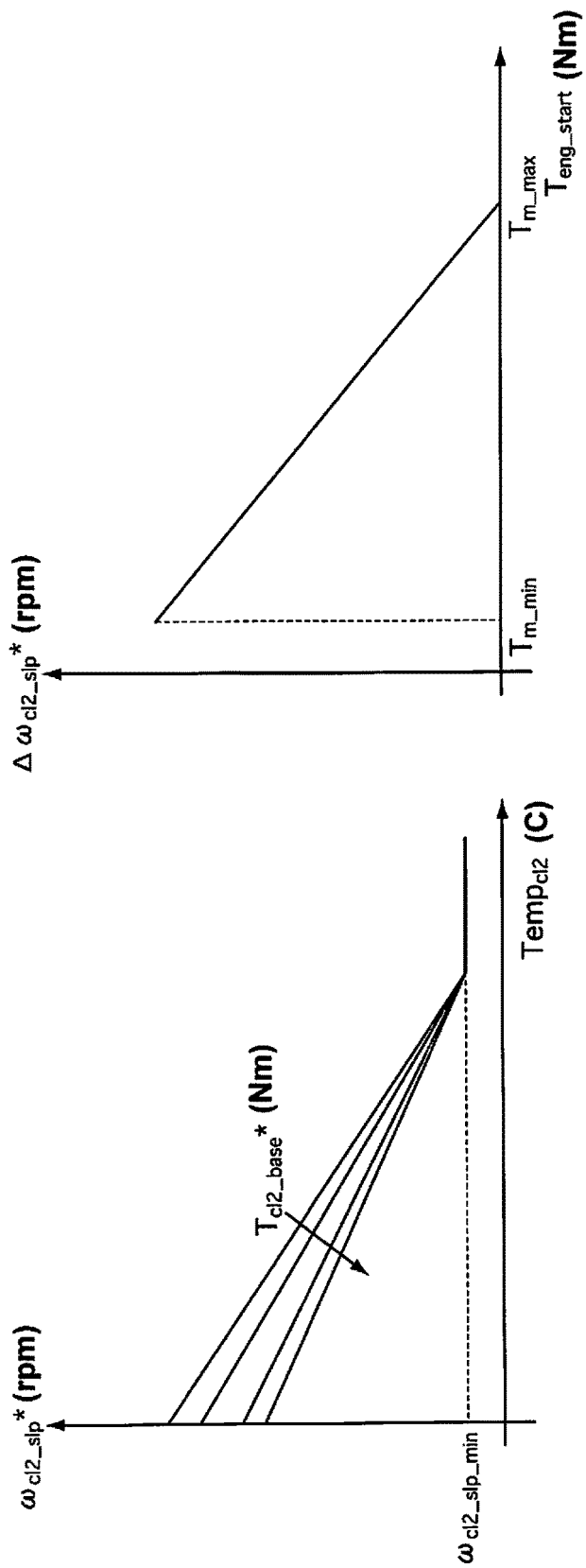
FIG. 6 (a) shows the second clutch slip rotational speed target value calculation map, based on a basic second clutch torque capacity command value, and a second clutch oil temperature, and FIG. 6 (b) shows the second clutch slip rotational speed target value calculation map, based on an allocated motor torque for starting the engine.

Here, $f_{cl2slp\ cl10p}()$ is a function to which the base second clutch torque capacity command value $T_{cl2\ base}^*$ and the second clutch oil temperature $\text{Temp}_{cl2}$ are input. In practice, for example, the above is set from a second clutch slip rotational speed target value calculation map, based on the base second clutch torque capacity command value $T_{cl\ base}^*$ and the second clutch oil temperature $\text{Temp}_{cl2}$, such as shown in FIG. 6(a). The second clutch slip rotational speed target value $\omega_{cl2\ slp}^*$ in the EV mode is set to decrease as the second clutch oil temperature Temp increases and is set to decrease as the base second clutch torque capacity command value $T_{cl\ base}^*$ increases, as illustrated in FIG. 6(a). When the "oil temperature is high" or when the "clutch capacity command value is large" in the second clutch 4, a rise in the clutch oil temperature can be prevented by decreasing the second clutch slip rotational speed target value $\omega_{cl2\ slp}^*$ specific luminance peak.

2. During engine torque starting $$\omega_{cl2\ slp}^* = f_{cl2\ slp\ cl10P}(T_{cl2\ base}^*. \text{Temp}_{cl2}) + f_{cl2\ \Delta\omega slp}(T_{eng\ start}) \qquad (15)$$

Here, $f_{cl2\ slp\ cl10P}()$ is a function for calculating a slip rotational speed increase amount for starting the engine, to which an engine start allocated motor torque $T_{eng\ start}$ is input. In practice, for example, a second clutch slip rotational speed target value calculation map, based on the engine start allocated motor torque $T_{eng\ start}$ as illustrated in FIG. 6(b), is used. The second clutch slip rotational speed target value $\omega_{cl2slp}^*$ during engine torque start is set to be higher as the engine start allocated motor torque $T_{eng\ start}$ decreases, as illustrated in FIG. 6(b). An abrupt engagement can thereby be prevented even if the rotational speed is reduced because disturbance from the first clutch 3 cannot be completely counteracted; as a result, the engine 2 can be started without generating an acceleration variation. If slip control is continued after starting the engine, the slip rotational speed is configured to be the same that as during EV traveling (the increased portion is not added).

Next, an input shaft rotational speed target value $\omega_{cl2i}^*$ is calculated based on the slip rotational speed target value $\omega_{cl2\ slp}^*$ and the output shaft rotational speed measurement value $\omega_0$, using the following formula.

$$\omega_{cl2i}^* = \omega_{cl2\ slp}^* + \omega_0 \qquad (16)$$

Finally, the upper and lower limits are set to the input rotational speed target value $\omega_{cl2i}^*$ calculated from the above formula so as to set a final input shaft rotational speed target value. The upper and lower limits are set as the upper and lower limits of the engine rotational speed.

Figure 7:
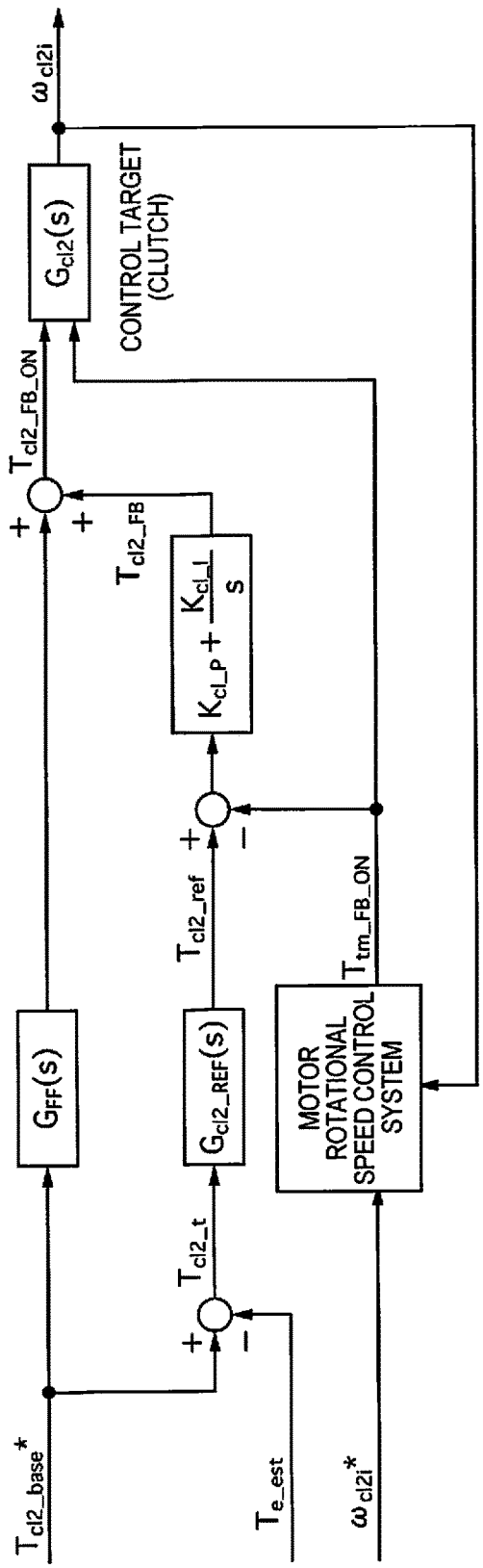
FIG. 7 is a block view of a feedback control for the second clutch.

Calculation of the Second Clutch Torque Capacity Command Value for Rotational Speed Control Next, the method for calculating the second clutch torque capacity command value for rotational speed control $T_{clFB\ ON}$ will be described in detail. FIG. 7 is a block view of a feedback control for the second clutch. The present control system is designed by a 2-degree-of freedom control method comprising a feed-forward (F/F) compensation and a feedback (F/B) compensation. Various methods of designing the F/B compensation unit can be conceived, but here, a PI control is described as one example. The calculation method thereof is described below. First, a phase compensation is applied to the base second clutch torque capacity command value $T_{cl2\ base}^*$ based on the phase compensation filter $G_{FF}(s)$, which is illustrated by the following formula, to calculate the F/F second clutch torque capacity command value $T_{cl2\ base}^*$. For the actual calculation, the calculation is done using a recurrence formula obtained by discretizing with Tustin approximation or the like.

Formula 2

$$\frac{T_{cl2\_FF}}{T_{cl2\ base}^*} = G_{FF}(S) = \frac{\tau_{cl2} \cdot S + 1}{\tau_{cl2\_ref} \cdot S + 1} \qquad (17)$$

Where, $\tau_{cl2}$: clutch model time constant $\tau_{cl2\ ref}$: normative response time constant for clutch control Next, the second clutch torque capacity target value $t_{cl2\ t}$ is calculated based on the following.

1. If in the EV mode $$T_{cl2\ t} = T_{cl2\ base}^* \qquad (18)$$

2. If in the HEV mode (first clutch is in the engaged state)

$$T_{cl2\ t} = T_{cl2\ base}^* - T_{e\ est} \qquad (19)$$

The second clutch torque capacity target value in the HEV mode refers to the capacity of the motor component with respect to the torque capacity of the whole (the engine 2 and the motor 1). $T_{e\ est}$ is the engine torque estimated value, which is, for example, calculated based on the following formula.

Formula 3

$$T_{e\_est} = \frac{1}{\tau_e S + 1} e^{-Les} \times T_{e\_base}^* \qquad (20)$$

Where, $\tau_e$: engine first order lag time constant $L_e$: engine dead time

Next, the second clutch torque capacity reference value $T_{cl2\_ref}$ is calculated based on the following formula.

Formula 4

$$\frac{T_{cl2\_ref}}{T_{cl2\_t}} = G_{cl2\_REF}(S) = \frac{1}{\tau_{cl2\_ref} \cdot S + 1} \quad (21)$$

Next, the F/B second clutch torque capacity command value $T_{cl2\_FB}$ is calculated based on the second clutch torque capacity reference value $T_{cl2\_ref}$ and the above-described motor torque command value for rotational speed control $T_{m\_FB\_ON}$ using the following formula.

Formula 5

$$T_{cl2\_FB} = \frac{K_{pcl2}S + K_{Icl2}}{S} \times (T_{cl2\_ref} - T_{m\_FB\_ON}) \quad (22)$$

Where,
$K_{pcl2}$: proportional gain for controlling the second clutch
$K_{Icl2}$: integral gain for controlling the second clutch
In addition, by considering the torque that is generated by the change in the input rotational speed (inertia torque) as in the following formula, the torque capacity can be precisely controlled even when the input rotational speed is changing.

Formula 6

$$T_{cl2\_FB} = \frac{K_{pcl2}S + K_{Icl2}}{S} \times (T_{cl2\_ref} - T_{m\_FB\_ON} - T_{cl2\_est}) \quad (23)$$

Here, $T_{Icl2\_est}$ is an inertia torque estimated value, which is obtained by, for example, multiplying the inertia moment around the input shaft by the input rotational speed change amount (differential value). Then, the F/F second clutch torque capacity command value $T_{cl2\_FF}$ and the F/B second clutch torque capacity command value $T_{cl2\_FB}$ are added to calculate the final second clutch torque capacity command value for rotational speed control $T_{cl2\_FB\_ON}$.

Calculation of the Torque Capacity Command Value

Figure 8:
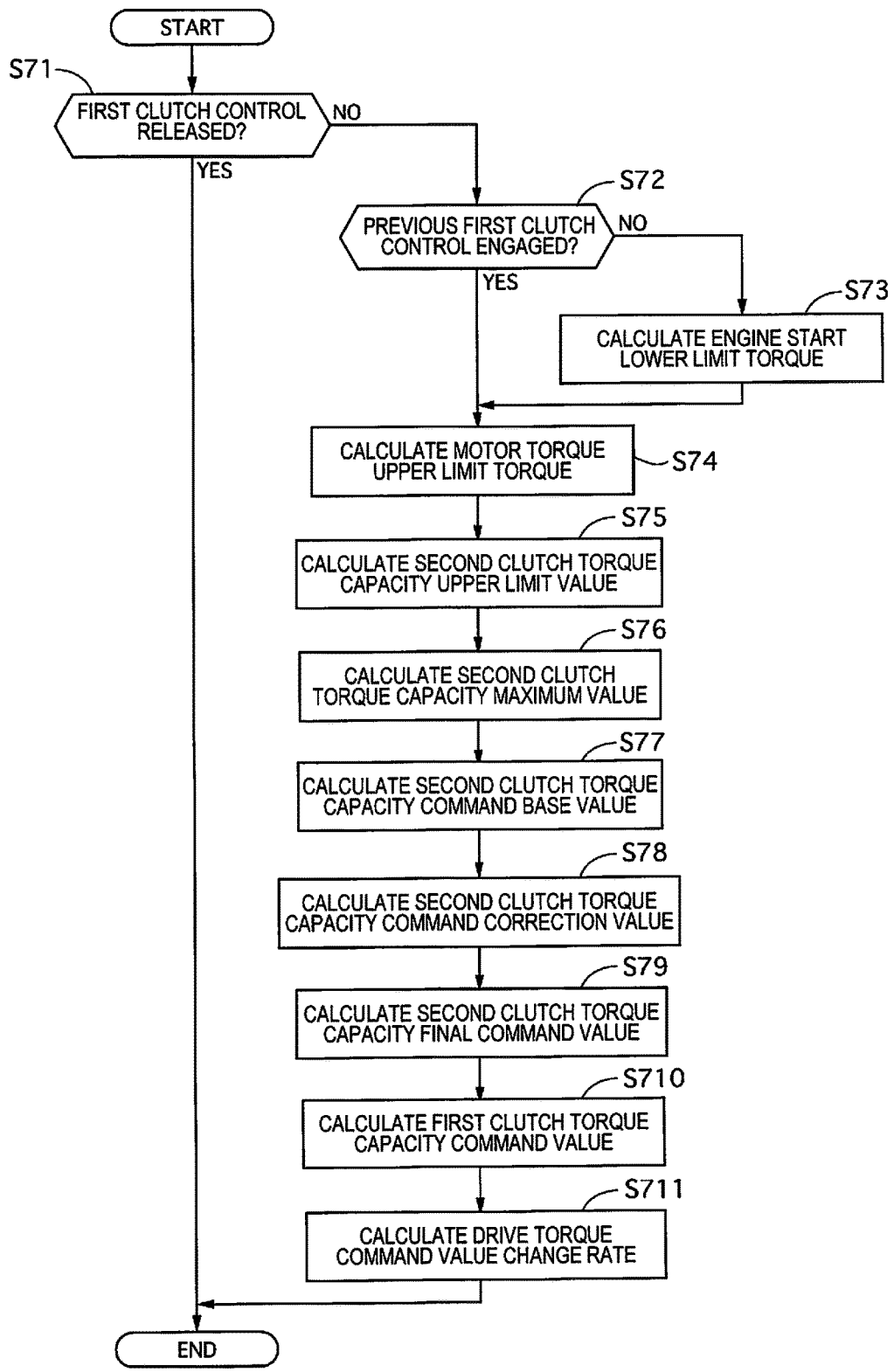
FIG. 8 is a flowchart illustrating the torque capacity command value calculation method for each clutch when starting the engine.

Next, the method for calculating the torque capacity command values $T_{cl1\_ENG\_START}$, $T_{cl2\_ENG\_START}$ of each clutch when starting the engine will be described in detail. FIG. 8 is a flowchart illustrating the torque capacity command value calculation method for each clutch when starting the engine. In step S71, whether or not the first clutch control mode is the release mode is determined. If not the release mode (if in the engaged mode), the operation proceeds to step S72; if in the release mode, the operation ends. In step S72, whether or not the previous first clutch control mode was the engaged mode is determined. If the previous mode was not the engaged mode (if the mode was the release mode), the operation proceeds to step S73; if the mode was the engaged mode, the operation proceeds to step S74.

In step S73 (drive torque command value change rate calculation means), the drive torque command value change rate (differential value) $dT_d^*/dt$ is calculated. The drive torque command value change rate (differential value) $dT_d^*/dt$ is calculated by, for example, using an approximate differentiation operation according to a bypass filter. In step S74 (engine start lower limit torque calculation means), an engine start lower limit torque $T_{ENG\_START}$, which is the minimum amount required for cranking in the current engine rotational speed, is calculated based on the engine rotational speed $\omega_e$ and the engine operating state $E_{sts}$ (whether or not this is after the initial explosion). In practice, if before the initial explosion, the calculation is performed using an engine start lower limit torque calculation map (refer to FIG. 9) that is prepared from a value obtained by adding the engine friction torque for each rotational speed obtained by experimentation or another means beforehand and a portion required for increasing the engine rotation. Additionally, if after the initial explosion, the value is obtained by subtracting the torque that is output by the engine itself from the torque that is necessary for ending the engine start (increased to the second clutch input rotational speed) within a predetermined time.

In step S75 (motor upper limit torque calculation means), the motor upper limit torque Tm HLMT is calculated from the battery charging amount SOC (or the terminal voltage $V_8$) and the input shaft rotational speed $\omega_{cl2i}$. In practice, the calculation is performed, for example, by using a motor upper limit torque calculation map, such as that illustrated in FIG. 10. In step S76 (second clutch torque capacity upper limit value calculation means), a second clutch torque capacity upper limit value $T_{cl2\_ENG\_START\_HLMT}$ is calculated based on the engine start lower limit torque $T_{ENG\_START}$ and the motor upper limit torque $T_{m\_HLMT}$.

$$T_{cl2\ ENG\ START\ HLMT} = T_{m\ HLMT} - T_{ENG\ START} \quad (24)$$

In step S77 (second clutch torque capacity maximum value calculation means), a second clutch torque capacity maximum value $T_{cl2\_ENG\_START\_max}$, which is the maximum value of the torque that can be allocated to the second clutch when starting the engine is calculated based on the motor upper limit torque $T_{m\_HLMT}$ and the engine start lower limit torque minimum value $T_{ENG\_START\_min}$) which is calculated in step S74, using the following formula.

$$T_{cl2\ ENG\ START\ max} = T_{m\ HLMT} - T_{cl2\ ENG\ START\ min} \quad (25)$$

The engine start lower limit torque minimum value $T_{ENG\_START\_min}$ is the minimum value of the engine start lower limit torque $T_{ENG\_START}$ throughout before and after the initial explosion, and a value obtained beforehand is used therefor.

In step S78, a second clutch torque capacity command base value for starting the engine $T_{cl2\_ENG\_START\_B}$ is determined based on the second clutch torque capacity upper limit value $T_{cl2\_ENG\_START\_HLMT}$ and the drive torque command value $T_d^*$ using the following.

1. When $T_d^* > T_{cl2\ ENG\ START\ HLMT}$ $T_{cl2\ ENG\ START\ B} = T_{cl2\ ENG\ START\ HLMT}$ 2. When $T_d^* \leq T_{cl2\ ENG\ START\ HLMT}$ $T_{cl2\ ENG\ START\ B} = T_d^*$ In step S79, the calculation is performed based on the drive torque command value $T_d^*$ and the change rate thereof $dT_d^*/dt$, using the following.

1. When $T_{cl2\ ENG\ START\ max} \geq T_d^*$ $K_{cl2\ ENG\ START} = 1.0$

Figure 11:
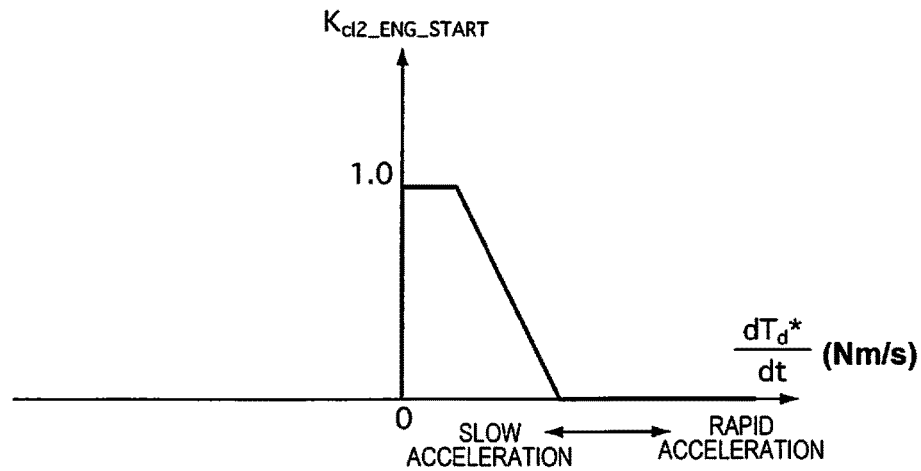
FIG. 11 is a characteristic view of the second clutch torque capacity command correction value corresponding to the drive torque command value change rate.

2. When $T_{cl2\ ENG\ START\ max} < T_d^*$ $K_{cl2\ ENG\ START} = f_{cl2\ ENG\ START}(dT_d^*/dt)$ $f_{cl2\_ENG\_START}(dT_d^*/dt)$ is a function to which the drive torque command value change rate $dT_d^*/dt$, which is set to the characteristic illustrated in FIG. 11, is input. FIG. 11 is a characteristic view of the second clutch torque capacity command correction value $K_{cl2\_ENG\_START}$, corresponding to the drive torque command value change rate $dT_d*/dt$; $K_{cl2\ ENG\ START}$ is 1.0 when $dT_d*/dt$ is within a range from zero to a first predetermined value and decreases as $dT_d*/dt$ increases when within a range from the first predetermined value to a second predetermined value (>the first predetermined value), and is zero when within a range that exceeds the second predetermined value.

In step S710, a final second clutch torque capacity command value for starting the engine $T_{cl2\ ENG\ START}$ is calculated based on the second clutch torque capacity command base value for starting the engine $T_{cl2\ ENG\ START\ B}$ and the second clutch torque capacity command correction value $K_{cl2\ ENG\ START}$, using the following formula.

$$T_{cl2\ ENG\ START} = T_{cl2\ ENG\ START\ B} \times K_{cl2\ ENG\ START} \tag{26}$$

In step S711, a first clutch torque capacity command value for starting the engine $T_{cl2\ ENG\ START}$ is calculated based on the motor upper limit torque $T_{m\ HLMT}$ and the second clutch torque capacity command value for engine start $K_{cl2\ ENG\ START}$, using the following formula.

$$T_{cl1\ ENG\ START} = T_{m\ HLMT} - T_{cl2\ ENG\ START} \tag{27}$$

Figure 12:
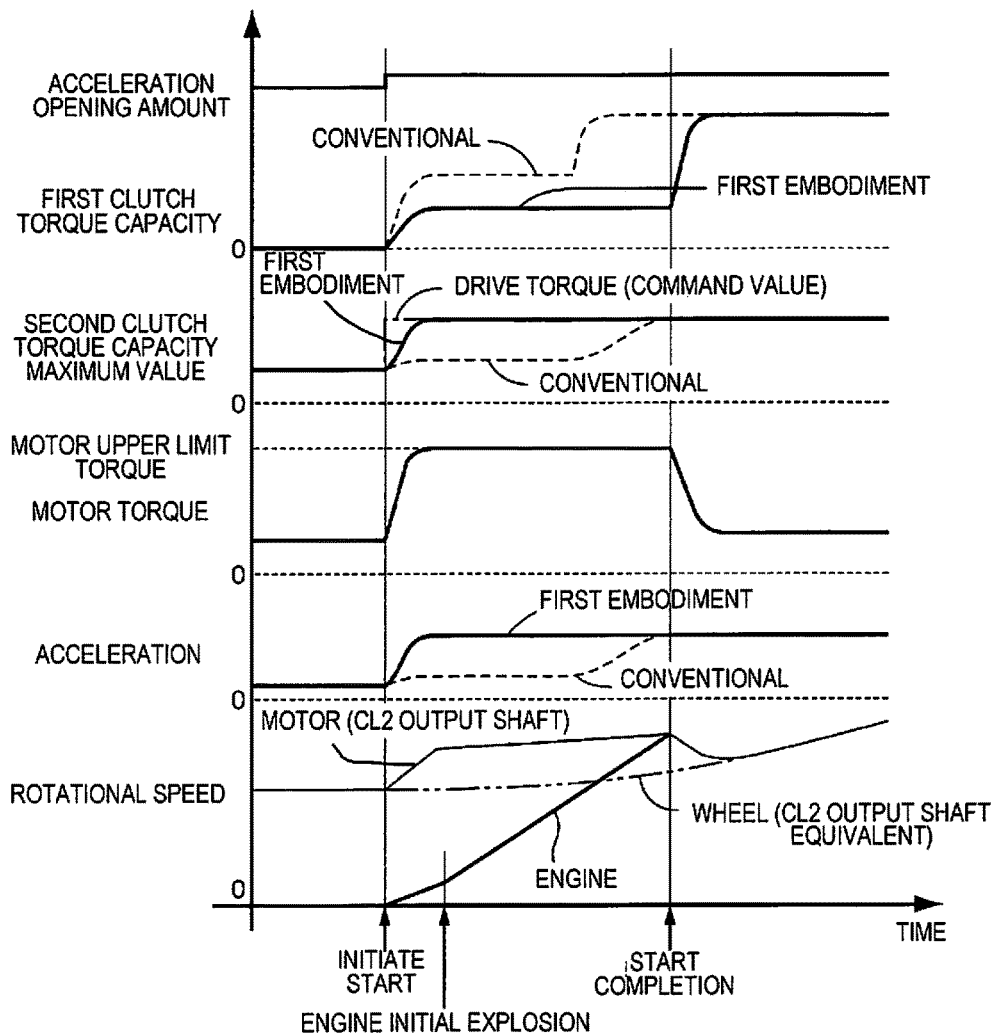
FIG. 12 is a time chart showing when the engine is started by an abrupt operation of the accelerator during EV traveling, as well as when traveling while the depression amount is at a low opening amount (abrupt acceleration).

Next, the effects are described. FIG. 12 is a time chart showing when the engine is started by an abrupt operation of the accelerator during EV traveling and when traveling while the depression amount is at a low opening amount (abrupt acceleration). In a conventional clutch control device, the allocation of the first clutch torque capacity is increased as the accelerator depression speed is increased; as a result, acceleration is stagnated, and the acceleration performance that is desired by the driver cannot be obtained from immediately after depression until starting the engine is completed. In contrast, in the first embodiment, when the accelerator depression amount is small and the drive torque command value $T_d*$ is equal to or less than the second clutch torque capacity maximum value $T_{cl2\ ENG\ START\ max}$, as in the situation illustrated in FIG. 12, the second clutch torque capacity command correction value $K_{cl2\ ENG\ START}$, which corrects the second clutch torque capacity command base value for engine start $T_{cl2\ ENG\ START\ B}$, takes the maximum value (1.0). That is, when the drive torque command value $T_d*$ can be realized by only the motor torque, the allocation of the second clutch torque capacity is maximized, regardless of the drive torque command value change rate $dT_d*/dt$. Here, since the drive torque command value $T_d*$ will be a larger value as the accelerator position opening amount Apo increases, to paraphrase the above, in the first embodiment, when the accelerator position opening amount Apo is a low opening amount (equal to or less than a predetermined accelerator position opening amount), the allocation of the second clutch torque capacity is maximized, regardless of the accelerator depression speed. That is, when the required acceleration of the driver is small and the drive torque command value $T_d*$ can be realized only by the drive torque command value $T_d*$, the drive torque can be matched with the drive torque command value $T_d*$ from immediately after depression by prioritizing the increase in the drive torque over the shortening of the engine start time. Therefore, since the acceleration stagnation can be improved with respect to the prior art described above, the desired acceleration performance of the driver can be obtained.

Figure 13:
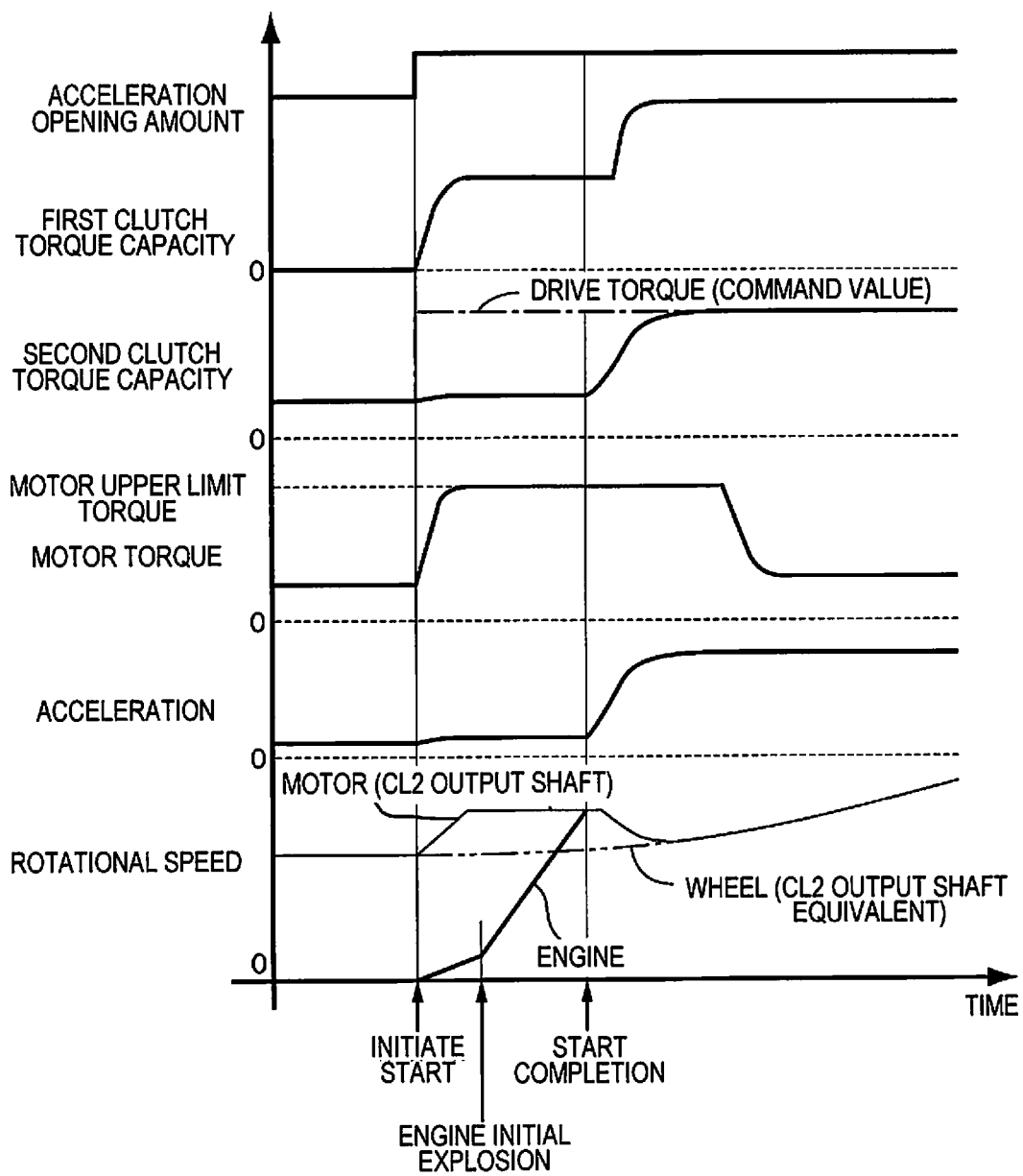
FIG. 13 is a time chart showing when the engine is started by an abrupt operation of the accelerator during EV traveling, as well as when traveling while the depression amount is at a high opening amount.

FIG. 13 is a time chart showing when the engine is started by an abrupt operation of the accelerator during EV traveling and when traveling while the depression amount is at a high opening amount. In this case, the drive torque command value $T_d*$ is larger than the second clutch torque capacity maximum value $T_{cl2\ ENG\ START\ max}$, and the second clutch torque capacity command correction value $K_{cl2\ ENG\ START}$ becomes $f_{cl2\ ENG\ START}(dT_d*/dt)$, taking a smaller value as the drive torque command value change rate $dT_d*/dt$ increases. That is, when the drive torque command value $T_d*$ cannot be realized by only the motor torque, the allocation of the first clutch torque capacity is increased as the drive torque command value change rate $dT_d*/dt$ increases. Here, since the drive torque command value change rate $dT_d*/dt$ will be a larger value as the accelerator depression speed increases, to paraphrase the above, in the first embodiment, when the accelerator position opening amount Apo is a high opening amount (exceeds the predetermined accelerator position opening amount), the allocation of the first clutch torque capacity is increased as the accelerator depression speed increases. In other words, if the required acceleration of the driver is large, the motor torque does not reach the drive torque command value $T_d*$ even if increased; as a result, engine torque is quickly generated by prioritizing the shortening of the engine start time over the increase in the drive torque. The drive torque can thereby be increased to the drive torque command value $T_d*$ at an early stage, and the desired acceleration performance of the driver can be obtained.

Figure 9:
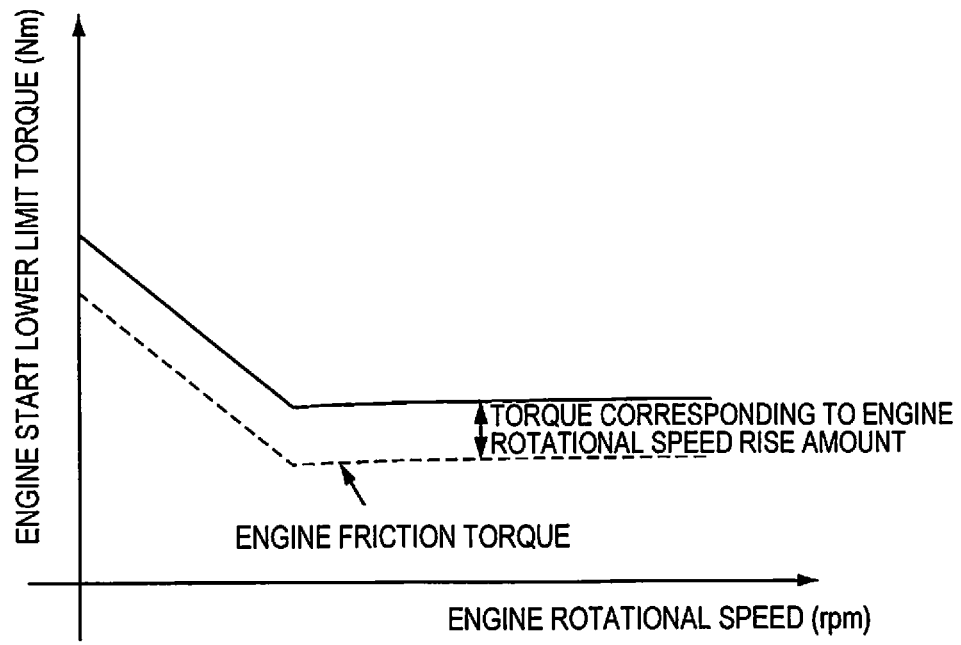
FIG. 9 is an engine start lower limit torque calculation map.
Figure 10:
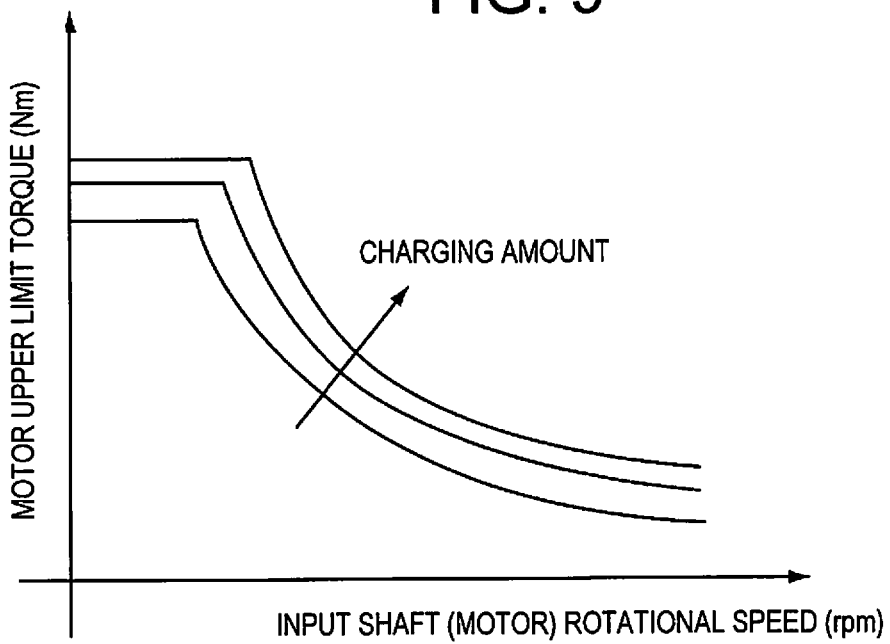
FIG. 10 is a motor upper limit torque calculation map.
Figure 14:
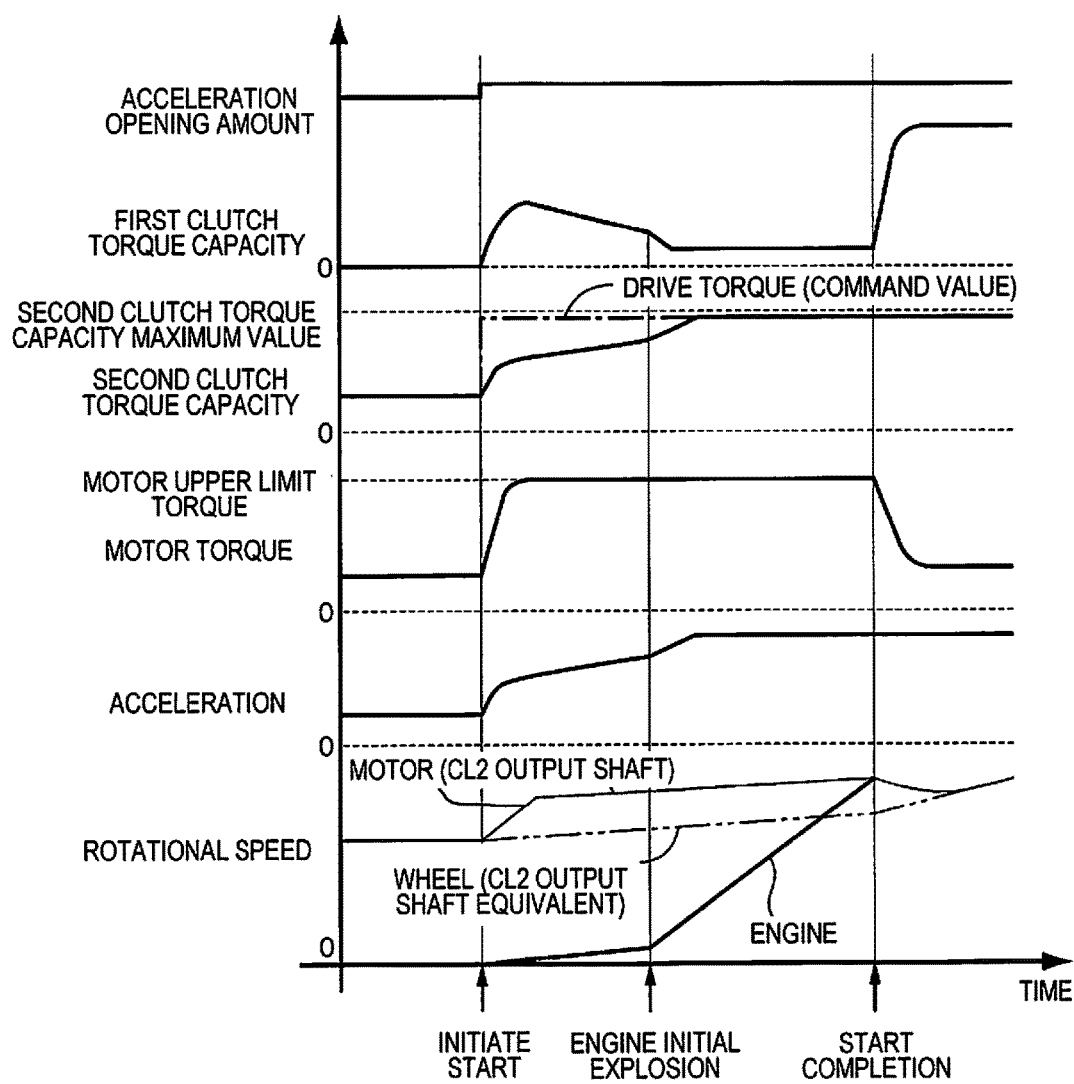
FIG. 14 is a time chart showing when the engine is started by an abrupt operation of the accelerator during EV traveling, as well as when traveling while the depression amount is at a medium opening amount.

FIG. 14 is a time chart showing when the engine is started by an abrupt operation of the accelerator during EV traveling and when traveling while the depression amount is at a medium opening amount. In this case, the drive torque command value $T_d*$ is less than the second clutch torque capacity maximum value $T_{cl2\ ENG\ START\ max}$, and the second clutch torque capacity command correction value $K_{cl2\ ENG\ START}$ takes the maximum value (1.0). Here, the engine start lower limit torque $T_{ENG\ START}$ becomes smaller as the engine rotational speed $\omega_e$ increases, as illustrated in FIG. 9. In particular, after the initial explosion of the engine, the engine itself generates a combustion torque; as a result, the cranking torque required for starting the engine becomes smaller, as compared to before the initial explosion. On the other hand, the motor upper limit torque $T_{m\ HLMT}$ decreases as the engine rotational speed $\omega_e$ increases in a region in which the engine rotational speed $\omega_e$ is high but is constant in a region in which the engine rotational speed $\omega_e$ is low, such as when starting the engine, as illustrated in FIG. 10. That is, the second clutch torque capacity upper limit value $T_{cl2\ ENG\ START\ HLMT}$ is increased as the engine rotational speed $\omega_e$ is increased. Therefore, in the first embodiment, after removing the engine start lower limit torque $T_{ENG\ START}$, all of the remainder required for starting the engine from the motor upper limit torque $T_{m\ HLMT}$, which is the torque that the motor 1 is capable of outputting (second clutch torque capacity upper limit value $T_{cl2\ ENG\ START\ HLMT}$), is set as the second clutch torque capacity command value for starting the engine $T_{cl2\ ENG\ START}$; the value obtained by subtracting the second clutch torque capacity command value for starting the engine $T_{cl2\ ENG\ START}$ from the motor upper limit torque $T_{m\ HLMT}$ is set as the first clutch torque capacity command value for starting the engine $T_{cl1\ ENG\ START}$. The drive torque of the vehicle can thereby be increased along with a rise in the engine rotational speed $\omega e$ while reliably starting the engine 2 within the range of the motor upper limit torque $T_{m\ HLMT}$; as a result, the drive torque can be matched with the drive torque command value $T_d*$ after the initial explosion of the engine and before starting the engine has been completed, that is, at a point in time before transitioning to the HEV mode, as illustrated in FIG. 14. Therefore, the stagnation of acceleration can be suppressed, and the desired acceleration can be obtained at an earlier stage.

The effects listed below can be obtained with the first embodiment, as described above.

(1) The embodiment comprises an engine 2, a motor generator 1, a first clutch 3 for interrupting a torque transmission between the engine 2 and the motor generator 1; a second clutch 4 for interrupting the torque transmission between the motor generator 1 and the driving wheels 21a, 21b; an integrated controller 13 for starting the engine 2 by utilizing the torque of the motor generator 1, when switching from an electric vehicle mode that cuts off the first clutch 3 and travels via the torque of the motor generator 1 to a hybrid mode that connects with the first clutch 3 and travels via the torque of the engine 2 and the motor generator 1; a motor upper limit torque calculation means (step S75) for calculating the motor upper limit torque $T_{m\_HLMT}$; and a transmission torque capacity allocating means (step S7) for allocating a first clutch torque capacity command value for starting the engine $T_{cl1\_ENG\_START}$ and a second clutch torque capacity command value for starting the engine $T_{cl2\_ENG\_START}$ within the range of the motor upper limit torque $T_{m\_HLMT}$ when starting the engine accompanying an accelerator depression, wherein the transmission torque capacity allocating means increases the allocation of the second clutch torque capacity command value for starting the engine $T_{cl2\_ENG\_START}$ when the accelerator position opening amount is equal to or less than a predetermined accelerator position opening amount, as compared to when exceeding the predetermined accelerator position opening amount. Therefore, when the required acceleration of the driver is small, the drive torque can be matched with the drive torque command value $T_d^*$ from immediately after depression by prioritizing the increase in the drive torque over the shortening of the engine start time, and an acceleration performance that is desired by the driver can be realized.

(2) The transmission torque capacity allocating means increases the allocation of the first clutch torque capacity command value for starting the engine $T_{cl1\_ENG\_START}$ as the accelerator depression speed increases when the accelerator position opening amount exceeds the predetermined accelerator position opening amount. Therefore, when the required acceleration of the driver is large, the engine torque can be quickly generated, and the drive torque can be increased to the drive torque command value $T_d^*$ at an earlier stage by prioritizing the shortening of the engine start time over the increase in the drive torque; as a result, the acceleration performance that is desired by the driver can be realized.

(3) The embodiment comprises a drive torque command value calculation means (step S3) for calculating the drive torque command value $T_d^*$ based on the accelerator position opening amount; a drive torque command value change rate calculation means (step S73) for calculating the change rate $dT_d^*/dt$ of the drive torque command value $T_d^*$; and a second clutch torque capacity maximum value calculation means (step S77) for calculating the second clutch torque capacity maximum value $T_{cl2\_ENG\_START\_max}$, which is the maximum value of the torque that can be allocated to the second clutch 4 when starting the engine by subtracting the engine start lower limit torque minimum value $T_{ENG\_START\_min}$, which is the minimum value of the engine start lower limit torque that is minimally required for cranking, from the motor upper limit torque $T_{m\_HLMT}$, wherein the transmission torque capacity allocating means maximizes the allocation of the second clutch torque capacity command value for starting the engine $T_{cl2\_ENG\_START}$ when the drive torque command value $T_d^*$ is equal to or less than the second clutch torque capacity maximum value $T_{cl2\_ENG\_START\_max}$, and increases the allocation of the first clutch torque capacity command value for starting the engine $T_{cl1\_ENG\_START}$ as the drive torque command value change rate $dT_d^*/dt$ increases, when the drive torque command value $T_d^*$ exceeds the second clutch torque capacity maximum value $T_{cl2\_ENG\_START\_max}$. That is, when the drive torque command value $T_d^*$ can be realized only by the motor torque, the drive torque can be matched with the drive torque command value $T_d^*$ from immediately after depression by prioritizing the increase in the drive torque. On the other hand, when the drive torque command value $T_d^*$ cannot be realized by only the motor torque, the engine torque can be quickly generated, and the drive torque can be increased to the drive torque command value $T_d^*$ at an earlier stage by prioritizing the shortening of the engine start time as the drive torque command value change rate $dT_d^*/dt$ increases.

(4) This comprises an engine start lower limit torque calculation means (S74) for calculating the engine start lower limit torque $T_{ENG\_START}$ that is minimally required for cranking at the current engine rotational speed, as well as a second clutch torque capacity upper limit value calculation means (S76) for calculating the second clutch torque capacity upper limit value $T_{cl2\_ENG\_START\_HLMT}$ that can be allocated to the second clutch 4, by subtracting the engine start lower limit torque $T_{ENG\_START}$ from the motor upper limit torque $T_{m\_HLMT}$, wherein the transmission torque capacity allocating means sets a value restricting the upper limit of the drive torque command value $T_d^*$ with the second clutch torque capacity upper limit value $T_{cl2\_ENG\_START\_HLMT}$ as the second clutch torque capacity command value for starting the engine $T_{cl2\_ENG\_START}$ and sets a value obtained by subtracting the second clutch torque capacity command value for starting the engine $T_{cl2\_ENG\_START}$ based on the motor upper limit torque $T_{m\_HLMT}$ as the first clutch torque capacity command value for starting the engine $T_{cl1\_ENG\_START}$ when the drive torque command value $T_d^*$ is equal to or less than the second clutch torque capacity maximum value $T_{cl2\_ENG\_START\_max}$; additionally, the transmission torque capacity allocating means sets a value obtained by reducing this to correct a value restricting the upper limit of the drive torque command value $T_d^*$ with the second clutch torque capacity upper limit value $T_{d2\_ENG\_START\_HLMT}$ as the drive torque command value $T_d^*$ change rate $dT_d^*/dt$ increases, as the second clutch torque capacity command value for starting the engine $T_{d2\_ENG\_START}$, and sets a value subtracting the second clutch torque capacity command value for starting the engine $T_{d2\_ENG\_START}$ from the motor upper limit torque $T_{m\_HLMT}$ as the first clutch torque capacity command value for starting the engine $T_{cl1\_ENG\_START}$, when the drive torque command value $T_d^*$ is greater than the second clutch torque capacity maximum value $T_{cl2\_ENG\_START\_max}$. Therefore, the drive torque of the vehicle can be increased along with a rise in the engine rotational speed $\omega_e$ while reliably starting the engine 2 within the range of the motor upper limit torque $T_{m\_HLMT}$; as a result, the stagnation of acceleration can be suppressed, and the desired acceleration can be obtained at an earlier stage.

Other Embodiments

A preferred embodiment of the present invention was described above based on one embodiment, but specific configurations of the present invention are not limited by the embodiment; changes to the design made without departing from the scope of the invention are also included in the present invention.

The invention claimed is:

1. A clutch control device for a hybrid vehicle comprising:
an engine;
a motor generator;
a first clutch for interrupting a torque transmission between the engine and the motor generator;
a second clutch for interrupting the torque transmission between the motor generator and driving wheels; and
at least one controller programmed to
start the engine by utilizing torque from the motor generator, when switching from an electric vehicle mode that cuts off the first clutch and travels via the torque of the motor generator to a hybrid mode that connects the first clutch and travels via the torque of the engine and the motor generator;
calculate a motor upper limit torque,
allocate a first clutch transmission torque capacity command value and a second clutch transmission torque capacity command value within the range of the motor upper limit torque when starting the engine accompanying an accelerator depression, the allocating including controlling both the first clutch and the second clutch to be in a power transmission state, and increasing the allocation of the second clutch transmission torque capacity command value when an accelerator position opening amount is equal to or less than a predetermined accelerator position opening amount, as compared to when exceeding the predetermined accelerator position opening amount,
increase the allocation of the first clutch transmission torque capacity command value as an accelerator depression speed increases when the accelerator position opening amount exceeds the predetermined accelerator position opening amount,
calculate a drive torque command value based on the accelerator position opening amount,
calculate a change rate of the drive torque command value,
calculate a second clutch torque capacity maximum value, which is the maximum value of the torque that can be allocated to the second clutch when starting the engine by subtracting an engine start lower limit torque minimum value, which is the minimum value of an engine start torque that is required for cranking from the motor upper limit torque, and
allocate the second clutch transmission torque capacity command value when the drive torque command value is equal to or less than the second clutch torque capacity maximum value, and increase the allocation of the first clutch transmission torque capacity command value as the drive torque command value change rate increases when the drive torque command value exceeds the second clutch torque capacity maximum value.

2. The clutch control device according to claim 1, wherein the at least one controller is further programmed to
calculate the engine start lower limit torque that is minimally required for cranking at a current engine rotational speed based on the engine rotational speed and whether or not an initial explosion has already occurred in the engine,
calculate a second clutch torque capacity upper limit value that can be allocated to the second clutch by subtracting the engine start lower limit torque from the motor upper limit torque,
set a first value restricting the upper limit of the drive torque command value with the second clutch torque capacity upper limit value as the second clutch transmission torque capacity command value,
set a second value obtained by subtracting the second clutch transmission torque capacity command value from the motor upper limit torque as the first clutch transmission torque capacity command value when the drive torque command value is equal to or less than the second clutch torque capacity maximum value,
set a third value obtained by reducing this to correct the first value restricting the upper limit of the drive torque command value with the second clutch torque capacity upper limit value as the accelerator depression speed increases, as the second clutch transmission torque capacity command value, and
set a fourth value subtracting the second clutch transmission torque capacity command value from the motor upper limit torque as the first clutch transmission torque capacity command value when the drive torque command value is greater than the second clutch torque capacity maximum value.

* * * * *